US010788643B2

(12) United States Patent
Chappell, II et al.

(10) Patent No.: US 10,788,643 B2
(45) Date of Patent: Sep. 29, 2020

(54) METHODS FOR THE INSTALLATION OF OVERHEAD TRANSMISSION LINES AND DEVICES THEREOF

(71) Applicant: Prince George Electric Cooperative, Waverly, VA (US)

(72) Inventors: Walter L. Chappell, II, Chester, VA (US); Brian S. Carr, Disputanta, VA (US)

(73) Assignee: PRINCE GEORGE ELECTRIC COOPERATIVE, Waverly, VA (US)

( * ) Notice: Subject to any disclaimer, the term of this patent is extended or adjusted under 35 U.S.C. 154(b) by 311 days.

(21) Appl. No.: 15/820,872

(22) Filed: Nov. 22, 2017

(65) Prior Publication Data
US 2019/0154944 A1    May 23, 2019

(51) Int. Cl.
*H02G 1/02* (2006.01)
*G02B 6/48* (2006.01)
*G02B 6/44* (2006.01)

(52) U.S. Cl.
CPC ............ *G02B 6/483* (2013.01); *G02B 6/4422* (2013.01); *G02B 6/4457* (2013.01)

(58) Field of Classification Search
CPC ............. G02B 6/483; G02B 6/48; G02B 6/00
See application file for complete search history.

(56) References Cited

U.S. PATENT DOCUMENTS

| | | | | |
|---|---|---|---|---|
| 400,552 A | * | 4/1889 | Donaldson | H02G 1/04 254/134.3 PA |
| 1,683,578 A | * | 9/1928 | Mobius | B61B 7/06 182/36 |
| 2,202,184 A | * | 5/1940 | Berger | B66D 3/046 254/409 |
| 2,858,106 A | * | 10/1958 | Anton | E04H 17/10 254/389 |
| 7,374,149 B1 | * | 5/2008 | Dacey | G02B 6/48 254/134 |
| 7,874,543 B2 | * | 1/2011 | Theisen | H02G 7/10 254/134.3 CL |
| 2019/0154944 A1 | * | 5/2019 | Chappell, II | G02B 6/483 |

\* cited by examiner

*Primary Examiner* — Lee D Wilson
(74) *Attorney, Agent, or Firm* — Troutman Pepper Hamilton Sanders LLP (Rochester)

(57) ABSTRACT

A method for overhead transmission line installation includes tension pulling a transmission line over a path between a first support structure having a first mounting location and a second support structure having a second mounting location extending from the first mounting location to a first transition location on the second support structure, to a second transition location on the first support structure, and to the second mounting location. The transmission line is mounted at the first mounting location and the second mounting location. The mounting provides a slack portion of the transmission line between the first mounting location and the second mounting location. A portion of the slack portion is mounted proximate to the first mounting location or the second mounting location to provide an overhead transmission line extending between the first mounting location and the second mounting location and a remainder of the slack portion.

10 Claims, 2 Drawing Sheets

METHODS FOR THE INSTALLATION OF OVERHEAD TRANSMISSION LINES AND DEVICES THEREOF

FIELD

This technology generally to methods for the installation of overhead transmission lines. More specifically, this technology relates to methods for the installation of overhead fiber optic cable transmission lines that allow for the accumulation of necessary excess fiber optic cable during overhead installation tension pulling procedures.

BACKGROUND

The installation of overhead fiber optic cable transmission lines is often performed using tension pulling techniques. Full tension pulling is preferred over slack-stringing and semi-tension methods, particularly in situations where it is necessary to keep the fiber optic cable off of the ground or where there are energized lines beneath the fiber cable transmission line being installed. Full tension pulling provides sufficient pulling capabilities on one end of the fiber cable transmission line and sufficient tension on the other end to keep the fiber cable transmission line clear of any obstacles during movement of the fiber cable transmission line from the reel it is stored on to its final installed position.

However, installing the fiber cable transmission line under full tension provides a lack of excess cable due to the tension on the cable during the installation process. Excess cable, or slack, is often required to be stored in certain locations along long pulls of fiber for later repairs and/or splices. In order to obtain the necessary slack after a tension pull, thousands of feet of slack cable may need to be pulled back for storage. Pulling the cable back to generate the necessary slack is very labor intensive and inefficient. Further, pulling the cable back can be hazardous when it must be performed at road or other crossings accessible to the public.

SUMMARY

A method for overhead transmission line installation includes tension pulling a transmission line over a path between a first support structure having a first mounting location and a second support structure having a second mounting location. The path extends from the first mounting location on the first support structure to a first transition location on the second support structure, from the first transition location on the second support structure to a second transition location on the first support structure, and from the second transition location on the first support structure to the second mounting location on the second support structure. The transmission line is mounted at the first mounting location and the second mounting location. The mounting provides a slack portion of the transmission line between the first mounting location and the second mounting location. A portion of the slack portion is mounted proximate to either the first mounting location or the second mounting location to provide an overhead transmission line extending between the first mounting location and the second mounting location and a remainder of the slack portion.

A kit for overhead transmission line installation includes a first roller wheel configured to be coupled to a first support structure and a second roller wheel configured to be coupled to a second support structure. The first roller wheel and the second roller wheel are configured to receive a transmission line for installation. The kit further includes a first transition device and a second transition device each comprising a bracket configured be coupled to either the first support structure or the second support structure and a pair of roller wheels configured to be removably coupled to the bracket.

The method of the present technology allows a user to accumulate necessary excess fiber during overhead fiber installation tension pulling procedures. The methods utilize a series of large rollers on portable brackets that can be attached to existing poles or temporary cross arms anywhere along long pulls where excess fiber, or slack, is needed to be stored for later repairs and/or splices. The installation techniques advantageously allow a user to accumulate the necessary excess fiber cable during the tension pulling, without having to perform any fiber pull back. Accordingly, examples of methods of the present technology advantageously allow for more efficient and safer tension pulls.

DETAILED DESCRIPTION

Figure 1:
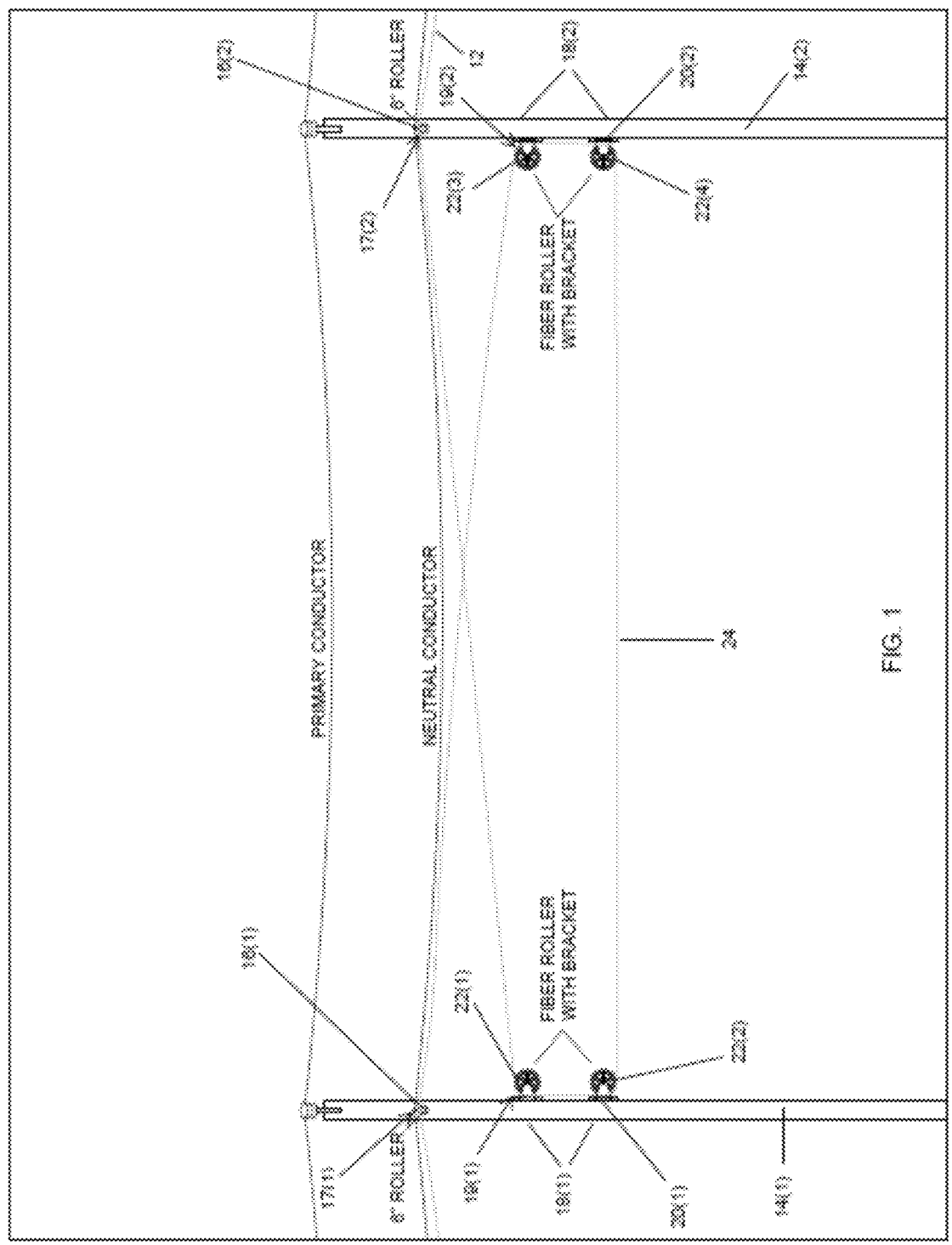
FIG. 1 is an exemplary environment for performing the methods of overhead transmission line installation of the present technology.

FIG. 1 is an exemplary environment 10 for performing the methods of fiber cable transmission line installation of the present technology. In this example, the exemplary environment includes fiber cable transmission line 12, utility poles 14(1) and 14(2), installation rollers 16(1) and 16(2), and bracket roller devices 18(1) and 18(2), although the exemplary environment may include other types and/or numbers of devices, components, or elements for performing the installation methods of the present technology. In this example the fiber cable transmission line 12 is illustrated being installed between utility poles 14 and 16, although other configuration may be contemplated. The present technology provides more efficient and safer methods of fiber cable transmission line installation. In particular, the methods of the present technology advantageously generate slack, which may be utilized for access to and/or repairs of the fiber cable, during tension-pull installation of the fiber cable without the need for excessive cable pull back.

In this example, the fiber cable transmission line 12 is a fiber optic transmission fiber, although the installation may be employed with other types of overhead transmission lines, such as conductive electrical lines, by way of example only. The fiber cable transmission line 12 may be any diameter fiber optic cable known in the art.

Although the utility poles 14(1) and 14(2) are illustrated, the method may be employed with any overhead transmission line support structure known in the art including, by way of example only, a support structure having multiple cross-arms for supporting overhead transmission lines. As shown in FIG. 1, the utility poles 14(1) and 14(2) can support additional overhead transmission lines in addition to the fiber cable transmission line 12, such as the illustrated primary conductor and neutral conductor, although the utility poles 14(1) and 14(2) may support other types and/or numbers of overhead transmission lines. In this example, utility poles 14(1) and 14(2) are located between 200 to 300 feet apart from one another, although the installation method may be employed over various distances.

The installation rollers 16(1) and 16(2) are located on the utility poles 14(1) and 14(2), respectively, for installation of the fiber cable transmission line 12. The installation rollers 16(1) and 16(2) are temporarily positioned on the utility poles 14(1) and 14(2) during installation and are removable after the installation is complete. The installation rollers 16(1) and 16(2) are located at approximately the same height on the utility poles 14(1) and 14(2) and are placed in mounting locations 17(1) or 17(2), or proximate to mounting locations 17(1) and 17(2), on the utility poles 14(1) and 14(2) to which the fiber cable transmission line 12 will be attached. By way of example, as discussed in further detail below, the installation rollers 16(1) and 16(2) may be replaced at the mounting locations 17(1) and 17(2) by mounting hardware, such as a dead end or a tangent, that securely mounts the fiber cable transmission line 12 to the utility poles 14(1) and 14(2), although other types of mounting hardware may be utilized for coupling the fiber cable transmission line 12 to the utility poles 14(1) and 14(2). The installation rollers 16(1) and 16(2) may be any installation rollers known in the art and are sized based on the diameter of the fiber cable transmission line 12 to be installed. In one example the installation rollers are 6" diameter rollers, although installation rollers having other diameters may be employed. By way of example, installation neoprene rollers produced by Sherman+Reilly, Chattanooga, Tenn., could be utilized.

The bracket roller devices 18(1) and 18(2) each include a bracket 20(1) and 20(2), respectively, that allow the bracket roller devices 18(1) and 18(2) to be temporarily coupled to the utility poles 14(1) and 14(2). The brackets 20(1) and 20(2) are coupled to the utility poles 14(1) and 14(2) below the installation rollers 16(1) and 16(2) to provide an acute angle as the fiber cable transmission line 12 traverses between an installation roller 16(1) or 16(2) to the opposing bracket roller device 18(1) or 18(2) during installation as described in further detail below. The brackets 20(1) and 20(2) are located on the utility poles 14(1) and 14(2) at transition locations 21(1) and 21(2), respectively, at approximately the same height above the ground as one another.

The bracket roller device 18(1) further includes roller wheels 22(1) and 22(2) coupled to bracket 20(1), while the bracket roller device 18(2) includes roller wheels 22(3) and 22(4) coupled to the bracket 20(2). Alternatively, each of the roller wheels 22(1)-22(4) can each have their own bracket for installation. Although each of the bracket roller devices 18(1) and 18(2) is described as having two roller wheels, additional roller wheels or other mechanisms to facilitate installation could be utilized on each of the bracket roller devices 18(1) and 18(2). The bracket roller devices 18(1) and 18(2) each include at least two roller wheels spaced apart on the brackets 20(1) and 20(2), respectively, to ensure that the fiber cable transmission line 12 is not bent at an angle greater than the allowed manufacturer bend radius during installation as described in further detail below. In one example, the fiber cable transmission line 12 is not bent an angle greater than 90 degrees during installation. The roller wheels 22(1)-22(4) may be any roller wheels known in the art and are sized to accommodate the fiber cable transmission line 12 being installed. By way of example, fiber roller wheels produced by Sherman+Reilly, Chattanooga, Tenn., could be utilized.

Figure 2:
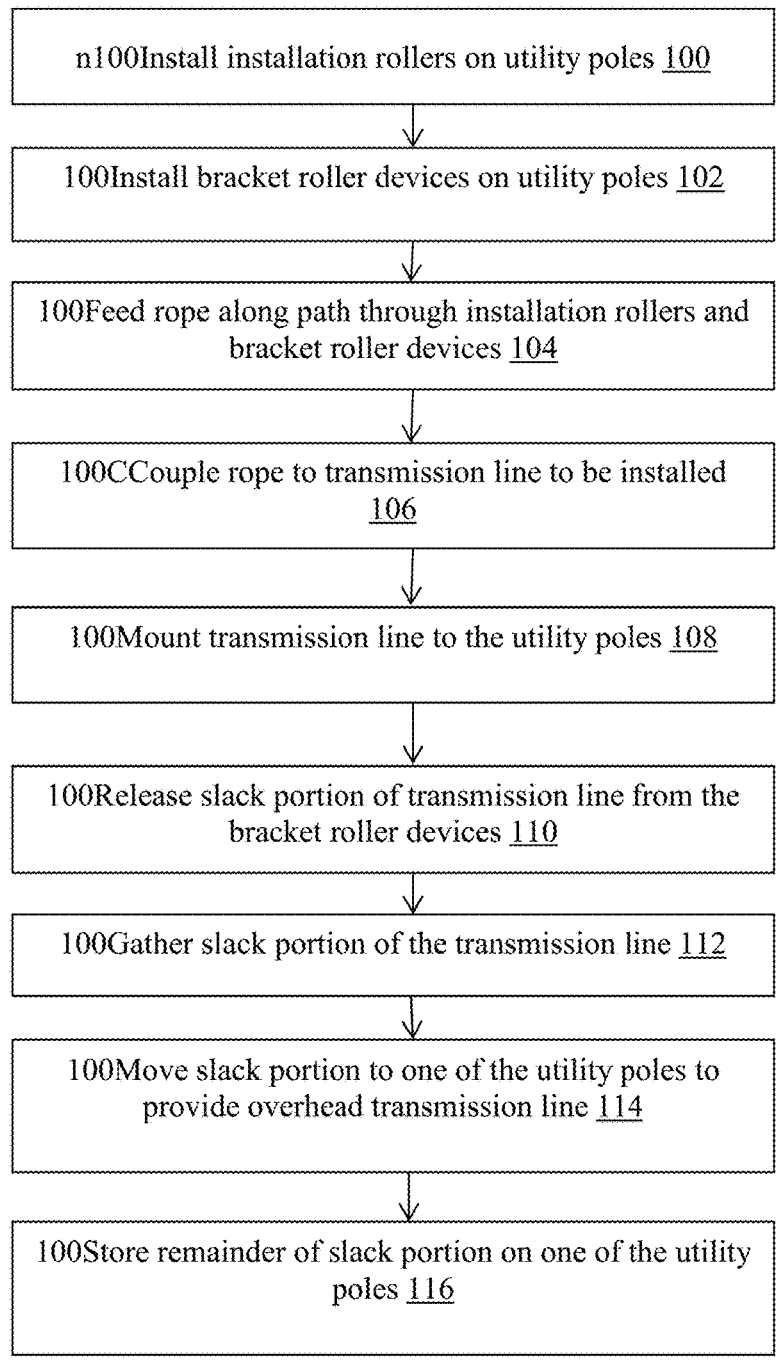
FIG. 2 is a flowchart for an exemplary method for the installation of overhead transmission lines of the present technology.

An exemplary method for the installation of overhead cable lines, specifically fiber cable transmission line 12, will now be described with respect to FIGS. 1 and 2. First, in step 100 the installation rollers 16(1) and 16(2) are installed on the utility poles 14(1) and 14(2), respectively. The installation rollers 16(1) and 16(2) are temporarily positioned on the utility poles 14(1) and 14(2) for installation purposes. In this example, the installation rollers 16(1) and 16(2) are located at approximately the same height above the ground on the utility poles 14(1) and 14(2) and are placed in a location, or proximate to a location, on the utility poles 14(1) and 14(2) to which the fiber cable transmission line 12 subsequently will be attached. The installation rollers 16(1) and 16(2) are coupled to the utility poles 14(1) and 14(2) using any coupling method known in the art.

Next, in step 102, the bracket roller devices 18(1) and 18(2) are installed on the utility poles 14(1) and 14(2), respectively. In this example, the bracket roller devices 18(1) and 18(2) are installed on the utility poles 14(1) and 14(2), respectively, by coupling the brackets 20(1) and 20(2) to the utility poles 14(1) and 14(2) using any known coupling method in the art. The bracket roller devices 18(1) and 18(2) are located below the installation rollers 16(1) and 16(2) to provide an angle as the fiber cable transmission line 12 traverses between one of the installation rollers 16(1) or 16(2) to the opposing bracket roller device 18(1) or 18(2) during installation as described in further detail below. The bracket roller devices 18(1) and 18(2) are positioned on the utility poles 14(1) and 14(2), respectively, at approximately the same height above the ground as one another. In one example, the bracket roller devices 18(1) and 18(2) are installed with the roller wheels 22(1)-22(4) pre-attached to brackets 20(1) and 20(2). Alternatively, the brackets 20(1) and 20(2) may be positioned on the utility poles 14(1) and 14(2), respectively, and then roller wheels 22(1)-22(4) may be coupled to the brackets 20(1) and 20(2). In this example, the roller wheels 22(1) and 22(2) are coupled to bracket 20(1), while the roller wheels 22(3) and 22(4) coupled to the bracket 20(2). In other examples, additional roller wheels could be utilized on each of the bracket roller devices 18(1) and 18(2).

Next, in step 104 a rope is fed through the various rollers to traverse between the utility pole 14(1) and the utility pole 14(2) as known in the art of tension pulling overhead transmission lines. Although the rope is described as traversing from the utility pole 14(1) to the utility pole 14(2), the rope may alternatively be introduced in the opposite direction. The rope is fed from a source (not shown) that provides a tension on the rope in the direction of the source. The rope extends around a path defined by the installation rollers 16(1) and 16(2) and the bracket roller devices 18(1) and 18(2) as described below.

The rope is delivered from the source and inserted through the installation roller 16(1). The rope then traverses from the installation roller 16(1) toward the utility pole 14(2) to the bracket roller device 18(2). The bracket roller device 18(2) is located at a lower height above the ground than the installation roller 16(1) such that the rope traverses between the utility poles 14(1) to 14(2) from the installation roller 16(1) to the bracket roller device 18(2) at an acute angle. The rope then enters the roller wheel 22(3) and is directed to the roller wheel 22(4). The rope then traverses back to the utility pole 14(1) from the bracket roller device 18(2) to the bracket roller device 18(1) in a direction substantially perpendicular to the utility poles 14(1) and 14(2). The rope then enters the roller wheel 22(2) and is directed to the roller wheel 22(1). The rope then traverses back toward the utility pole 14(2) from the bracket roller device 18(1) to the installation roller 16(2) at an acute angle generated by the height difference between the bracket roller device 18(1) and the installation roller 16(2). The rope is inserted into the installation roller 16(2) and extended beyond the utility pole 14(2).

In step 106, the rope is coupled to the fiber cable transmission line 12 to be installed at the location beyond the utility pole 14(2). The fiber cable transmission line 12 is then tension pulled back through the system of rollers including the installation rollers 16(1) and 16(2) and the bracket roller devices 18(1) and 18(2) in the opposite direction from which the rope was inserted as described above with respect to step 104. The bracket roller devices 18(1) and 18(2) each include at least two roller wheels 22(1)-22(2) and 22(3)-22(4), respectively, spaced apart on the brackets 20(1) and 20(2) to ensure that the fiber cable transmission line 12 is not bent at an angle greater than the allowed manufacturer bend radius during installation. This configuration avoids bending the fiber cable transmission line 12 at an angle of greater than 90 degrees, which may cause damage to the fiber cable transmission line 12 or void any warranty thereon. FIG. 1 illustrates the position of the fiber cable transmission line 12 after it is tension pulled using the methods of the present technology.

Next, in step 108, the fiber cable transmission line 12 is mounted to at least one of the utility poles 14(1) and 14(2) using mounting techniques known in the art. By way of example, the installation rollers 16(1) and 16(2) may be replaced by mounting hardware, such as a dead end or a tangent that securely mounts the fiber cable transmission line 12 to the utility poles 14(1) and 14(2) at the locations where the installation rollers 16(1) and 16(2) were previously located.

In step 110, the portion of the of the fiber cable transmission line 12 located between the utility poles 14(1) and 14(2) is released from the bracket roller devices 18(1) and 18(2). This provides a slack portion 24 of the fiber cable transmission line 12, which provides excess fiber cable transmission line that can be stored on one of the utility poles 14(1) or 14(2) for later repairs and/or splices. The slack portion 24 is advantageously generated without the need to pull back large portions of the fiber cable transmission line 12.

In step 112, the slack portion 24 of the fiber cable transmission line 12 is gathered together into a fiber roll using known techniques, such as a figure-eight rolling technique. The amount of the slack portion 24 of the fiber cable transmission line 12 is determined by the span length, whereas the slack portion 24 will be double the span length.

In step 114, the slack portion 24 is moved to one or the utility poles 14(1) or 14(2) for storage thereon. Moving the slack portion 24 to one of the utility poles 14(1) or 14(2) establishes a portion of the fiber cable transmission line 12 that traverses directly between the utility pole 14(1) and the utility pole 14(2). The remainder of the slack portion 24 of the fiber cable transmission line 12 can then, in step 116, be stored on the utility pole.

Accordingly, examples of the present technology provide a method for the installation of overhead cable lines that allows for the accumulation necessary excess fiber during overhead fiber installation tension pulling procedures. The method utilizes a series of large rollers on portable brackets that can be attached to existing poles or temporary cross arms anywhere along long pulls where excess fiber, or slack, is needed to be stored for later repairs and/or splices. The installation techniques advantageously allow for the accumulation of the necessary excess fiber cable during the tension pulling, without having to perform any pull back. Accordingly, the methods of the present technology advantageously allow for more efficient and safer tension pulls.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for overhead transmission line installation, the method comprising:
   tension pulling a transmission line over a path between a first support structure having a first mounting location and a second support structure having a second mounting location, wherein the path extends from the first mounting location on the first support structure to a first transition location on the second support structure, from the first transition location on the second support structure to a second transition location on the first support structure, and from the second transition location on the first support structure to the second mounting location on the second support structure, wherein the first mounting location and the second mounting location are non-planar with, and offset from, the second transition location and first transition location on the first support structure and the second support structure, respectively;
   mounting the transmission line at one of the first mounting location or the second mounting location, wherein the mounting provides a slack portion of the transmission line between the first mounting location and the second mounting location; and
   mounting a portion of the slack portion proximate to either the other one of first mounting location or the second mounting location to provide an overhead transmission line extending between the first mounting location and the second mounting location and a remainder of the slack portion.

2. The method of claim 1 further comprising:
   storing the remainder of the slack portion on the other one of the first support structure or the second support structure.

3. The method of claim 2, wherein the remainder of the slack portion is stored on the first support structure when the portion of the slack portion is mounted proximate the first mounting location.

4. The method of claim 2, wherein the remainder of the slack portion is stored on the second support structure when the portion of the slack portion is mounted proximate the second mounting location.

5. The method of claim 1 further comprising:
   installing a first transition device at the first transition location and a second transition device at the second transition location.

6. The method of claim 5, wherein the first transition device and the second transition device each comprise a pair of roller wheels removably coupled to a bracket, wherein the installing comprises coupling the brackets to the second support structure and the first support structure, respectively.

7. The method of claim 5 further comprising:
removing the transmission line from the first transition device and the second transition device after the mounting of the transmission line at the one of the first mounting location or the second mounting location to provide the slack portion of the transmission line between the first mounting location and the second mounting location.

8. The method of claim 1, wherein the path extends from the first mounting location on the first support structure to a first transition location on the second support structure at a first acute angle, and from the second transition location on the first support structure to the second mounting location on the second support structure at a second acute angle.

9. The method of claim 1, wherein the path does not include any angles above a manufacture bend radius for the transmission line.

10. The method of claim 1, wherein the transmission line comprises a fiber optic cable.

* * * * *